Patented Sept. 20, 1932

1,877,952

UNITED STATES PATENT OFFICE

LYDIA O'LEARY, OF PELHAM, NEW YORK

DERMAL COVER PREPARATION

No Drawing.   Application filed December 31, 1930.   Serial No. 505,985.

The object of this invention is to provide a dermal preparation to be used to cover and conceal birthmarks and other skin blemishes and to simulate the adjoining or unblemished portion of the skin in texture, flexibility and other purely physical qualities characteristic of the normal skin, and also in color quality on the application to the preparation of a pigment appropriate to the particular type of complexion of the individual treated, and which shall be harmless to the skin, avoid discomfort, and be adapted to withstand the presence of water and at least the casual contact of the hands or a handkerchief without being removed or appreciably disturbed.

My invention contemplates a mixture of an impalpable powder of some form of zinc with glycerine and water, which mixture if the mentioned ingredients are combined so that a pasty composition results will when applied have those purely physical characteristics of similarity to the normal skin which are above set forth and will further simulate the skin in color on combining therewith the appropriate pigment. By the term "mixture" as here used I mean to define that the mentioned ingredients are associated by mechanical action and without the presence of any other ingredient which would effect a material chemical change in any of them. For, while it is known to use one or other of the named ingredients in general cosmetic preparations, so far as I am aware such have heretofore been used only in presence of some other ingredient which produces some appreciable chemical change that I have found to militate against the advantages and efficacy of my preparation, to say nothing of their being incidentally likely to cause injury to the skin.

Again, an important feature of my invention is that the named ingredients shall be compounded in approximately the proportion to be stated. If there is a material excess of the zinc content the application will lack flexibility and is likely to crack or flake. If there is a material excess of the glycerine content the preparation is disposed to streak on application and has such a smeary quality as unduly postpones its setting. If there is a material excess of water the application will draw the skin and is likely to crack or flake.

Another important feature of my invention is that a preparation, containing the impalpable zinc powder, glycerine and water, is preferably produced which has such consistency as to be a thin paste approximating a liquid, whereby good coverage, with the other qualities mentioned above, may be attained and yet the preparation is capable of quick and facile application, as with a camel's hair brush.

It will be understood that with glycerine and water both present the glycerine affords a binder for the zinc particles and the water produces the consistency desired, being further retained more or less permanently in the preparation against evaporating due to the hydroscopic property of the glycerine.

An application of my preparation is exceedingly durable. It is not deleteriously affected by either water, alone, or at least casual rubbing or wiping, alone. Indeed, while rubbing or wiping in the presence of water may disarrange it, its removal thereby is not usually possible in many cases without unduly irritating the skin. Nevertheless it quickly and easily responds to removal if a suitable greasy substance, preferably cleansing cream, be applied.

The proportion of the ingredients and the manner of compounding the same are preferably as follows: I take 2041 grams of the zinc oxide (U. S. P.), or it may be zinc powder in some other impalpable form, as silicate of zinc (calamine); 720 cubic centimeters of distilled water and 300 cubic centimeters of glycerine and mix them thoroughly together for about ten minutes in a mortar with a pestle.

So far as simulation of the normal skin in flexibility, texture, durability, etc., is concerned this mixture when applied to the skin will be found to offer so close an approximation to the natural unblemished skin as to make it very difficult to distinguish between the two, the covered mark being moreover perfectly concealed even though naturally very conspicuous. In order to impart to it a simulation in respect to color a small quantity of any suitable pigment may be introduced. If this is a powder, as Synthetic Ochre D. C. or Synthetic Brown Y, for example, in which there may be lumps or other bodies that might cause failure of uniform color-blending on simply mixing the color substance with the base of the composition formed by mixing the zinc powder, water and glycerine I find it best to mix a small portion of such base first with the color powder for about five minutes until they are thoroughly blended and then mix this mixture with the remainder of the base.

As indicated, the preparation when compounded preferably according to the above formula, is a thin paste approximating a liquid and in that form it may be applied with a camel's hair brush, followed by massage. If desired, as in facial applications, powder and rouge may be applied to it to obtain the same tone or color there as the individual wishes unblemished portions of the face to artificially present: the application of such substances will not deleteriously affect the coating.

Having thus fully described my invention what I claim is:

A composition for concealing skin blemishes such as birthmarks, which comprises zinc in impalpable powder form, glycerine and water, in approximately the proportions of 2041 grams of the zinc powder, 300 cubic centimeters of the glycerine and 720 cubic centimeters of the water, the said composition constituting a thick opaque liquid adapted for application with a brush, providing a yielding non-cracking coating that adheres to the blemish, simulating the normal skin and concealing by its opaque character the underlying discoloration.

In testimony whereof I affix my signature.

LYDIA O'LEARY.